(12) United States Patent
Jennings

(10) Patent No.: US 6,436,306 B1
(45) Date of Patent: Aug. 20, 2002

(54) PERFLUOROALKYL-SUBSTITUTED AMINO ACID OLIGOMERS OR POLYMERS AND THEIR USE AS FOAM STABILIZERS IN AQUEOUS FIRE-FIGHTING-FOAM AGENTS AND AS OIL REPELLENT PAPER AND TEXTILE FINISHES

(75) Inventor: John Jennings, Bronx, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/484,636

(22) Filed: Jan. 18, 2000

Related U.S. Application Data

(60) Provisional application No. 60/116,640, filed on Jan. 21, 1999, now abandoned.

(51) Int. Cl.$^7$ .......................... A62C 5/00; D21H 19/00; C08G 69/00
(52) U.S. Cl. .............................. 252/3; 528/328; 162/66; 427/411; 252/2
(58) Field of Search .......................... 252/2, 3; 162/166; 528/332, 328; 427/411

(56) References Cited

U.S. PATENT DOCUMENTS

| | | | |
|---|---|---|---|
| 3,671,493 A | 6/1972 | Lo Monaco et al. | 260/75 |
| 3,952,060 A | 4/1976 | Huber-Emden et al. | 260/584 |
| 5,491,261 A | 2/1996 | Haniff et al. | 562/582 |
| 5,688,527 A * | 11/1997 | Bordier et al. | 424/450 |
| 5,750,043 A | 5/1998 | Clark | 252/2 |

FOREIGN PATENT DOCUMENTS

| | | |
|---|---|---|
| DE | 2 018 461 | 11/1971 |
| EP | 0955327 | 11/1999 |
| FR | 2701407 | 8/1994 |
| GB | 1214528 | 12/1970 |

OTHER PUBLICATIONS

F. Szönyi, Com. Journ. Com. Esp. Deterg., vol. 22, pp. 297–304 (1991).

Derwent Abstr. 1994–279696 for FR 2701407—Aug. 1994.

* cited by examiner

*Primary Examiner*—Cephia D. Toomer
(74) *Attorney, Agent, or Firm*—Kevin T. Mansfield

(57) ABSTRACT

Perfluoroalkyl-substituted amino acid oligomers or polymers obtainable from (A) an aliphatic diamino acid having 3 to 10 carbon atoms such as lysine, (B) a chain extender such as epichlorohydrin, a dihalide or an aliphatic diepoxide, (C) an amino-reactive allyl compound and (D) a perfluoroalkyl iodide, and, optionally, other reactants, are useful as grease-proofing agents for paper and are excellent foam stabilizers for Aqueous Fire-Fighting Foam (AFFF) formulations used on polar solvent fires.

22 Claims, No Drawings

PERFLUOROALKYL-SUBSTITUTED AMINO ACID OLIGOMERS OR POLYMERS AND THEIR USE AS FOAM STABILIZERS IN AQUEOUS FIRE-FIGHTING-FOAM AGENTS AND AS OIL REPELLENT PAPER AND TEXTILE FINISHES

This application claims the benefit under 35 U.S.C. 119(e) of U.S. Provisional Application No. 60/116,640, Filed Jan. 21, 1999, now abandoned.

FIELD OF THE INVENTION

This invention relates to novel perfluoroalkyl-substituted amino acid derivatives and their use in water dispersible polymeric foam stabilizers for aqueous, alcohol-resistant, polar fire fighting foam formulations (AR-AFFF), and for textile and paper oil-proofing finishes. More particularly it relates to oligomers or copolymers of an aliphatic diamino acid with 3 to 10 carbon atoms such as lysine with a chain extender and having at least two perfluoroalkyl groups attached to nitrogen atoms.

BACKGROUND OF THE INVENTION

Aqueous Fire-Fighting Foam (AFFF) formulations contain water-soluble fluorosurfactants along with hydrocarbon surfactants. They are effective in extinguishing non-polar solvent fires. When an AFFF formulation comes in contact with a burning hydrocarbon fuel, the water, which contains both fluoro- and hydrocarbon surfactants, drains from the foam and forms a thin film on top of the burning fuel. This film does not sink, but due to its low surface energy (<18 dynes/cm, which is lower than that of heptane), it spontaneously spreads across the surface of the burning fuel. There it acts as a vapor suppressant and, in combination with the aqueous foam, extinguishes the fire and prevents reigniton of the fuel. It is important in this application that the foam have a long foam life on the hot fuel; otherwise the fuel can reignite, an event called bumback. A long foam life which provides bumback resistance is achieved by having a foam which is "wet", that is hydrated, and from which water can drain down onto the surface and replenish the seal. On a non-polar fuel like gasoline, this task is simple since water and the water-soluble surfactants are not soluble in the fuel.

This task is considerably more difficult on polar fuels like isopropanol and acetone. Besides the fluoro- and hydrocarbon surfactants found in conventional AFFF formulations, an Alcohol-Resistant (=AR) AFFF formulation contains a water-soluble but polar-solvent insoluble fluorochemical— also referred to as "alcoholophobic"—foam stabilizer (as described in this invention) along with a polysaccharide such as xanthan gum. When these additional materials come in contact with a burning polar fuel fire, they precipitate and give rise to a membrane which protects the foam from dissolving in the polar solvent. This membrane creates a vapor barrier which extinguishes the fire and prevents reignition of the fuel along with keeping the foam hydrated.

Polysaccharides and/or high molecular weight synthetic polymers may be used in AR-AFFF formulations without a fluorochemical foam stabilizer and provide about the same efficacy. The problem with a foam concentrate containing only polysaccharides and/or high molecular weight synthetic polymers is that its viscosity is high, and the concentrate behaves in a thixotropic manner. It is difficult to use a high viscosity foam concentrate since it is hard if not impossible to pump it through a fire nozzle. AR-AFFF formulations containing fluorochemical foam stabilizers require much lower amounts of polysaccharides and/or high molecular weight synthetic polymers, thus lowering the viscosity of the foam concentrate. Additionally, foam concentrates containing fluorochemical foam stabilizers in AR-AFFF formulations tend to behave in a Newtonian manner.

Fire fighting foam stabilizers containing at least one perfluoroalkyl group and water-solubilizing functionalities such as carboxy and amido groups are described in U.S. Pat. Nos. 4,460,480 and in 5,218,021.

French patent application 2,637,506-A describes an alcoholophobic and oleophobic fire extinguishing foam concentrate which contains a polyhydroxy-polyamine containing at least one quaternary N atom and/or a polysaccharide which is chemically bonded to highly fluorinated $C_4$–$C_{20}$ alkyl groups, instead of containing the fluorosurfactant and the polysaccharide or other alcoholophobic agent separately in the concentrated mixture.

Alcoholophobic fire fighting foam stabilizers containing at least one perfluoroalkyl group along with poly-quaternary ammonium and carboxy functionalities are described in world patent applications WO 90/02110 A1 and WO 90/03966 A1 along with publications by S. Szönyi in Fire Safety Journal, 16, pp. 353–365 (1990) and Progress in Colloid & Polymer Science, 81, 136–139 (1990).

Since quaternary ammonium groups cause incompatibility with the anionic surfactants used in fire fighting formulations, further improvements have been described in WO 94/18245. This reference teaches compounds which contain a combination of at least two perfluoroalkyl groups, amino groups other than quaternary ammonium groups, carboxylic groups and other water-solubilizing groups attached to amino groups.

S. Szönyi, Com. Journ. Com. Esp. Deterg., 22, pp.297–304 (1991) a refers to a commercial state-of-the-art alcoholophobic foam stabilizer, MX30, as a perfluoroalkylated polyamino acid. However, from the various Szönyi references discussed above it appears that MX30 is a polyamine derivative with perfluoroalkyl and COOH groups attached to amino nitrogens via a linking group.

U.S. Pat. No. 4,606,973 discloses aminoethylmethacrylate-acrylic acid copolymers in which the amino groups have been reacted with perfluoroalkyl carboxylic acids.

Japanese patent application S59-230566 describes foam stabilizers useful for polar solvents which contain an anionic or amphoteric fluorosurfactant, polyethylenimine of MW 4,000 to 100,000, and a polybasic acid compound.

U.S. Pat. No. 3,769,307 claims perfluoroalkylsubstituted polyethylenimine compositions and the preparation thereof. This patent also claims the use of such compounds as textile finishes providing oleophobic properties. German Offenlegungsschrift 2 018 461 describes surface-active agents and foam stabilizers for polyurethane foams which are polyethylenimines substituted by one or more perfluoroalkyl groups, as well as perfluoroalkyl-substituted polyamines containing up to 16 carboxy or sulfonic acid groups and/or hydrophilic amide groups. Although not directed toward foam stabilizer compounds for polar solvent fire fighting foams, the composition of this patent is described as very soluble in alcohol/water mixtures, but poorly soluble in alcohol (="alcoholophobic") and water itself, making it a candidate for such foam stabilizers. Indeed, the above-mentioned WO 94118245 reference describes the synthesis of a perfluoroalkyl- and carboxy-substituted polyethylenimine from tetraethylene-pentamine, a perfluoroalkyl acyl chloride and chloroacetic acid.

U.S. Pat. No. 5,750,043 also describes foam stabilizers containing polyamines wherein the amino groups are partially or completely substituted by perfluoroalkyl groups as well as hydrophilic groups, such as carboxy groups.

Effective foam stabilizers on polar solvents have to be essentially insoluble in these solvents. Most commonly used are polyamines which are N-substituted by perfluoroalkyl and carboxy groups, such as those described above. The present invention discloses a new class of poly-perfluoroalkyl- and carboxy-substituted amines in which the carboxy groups are attached to a carbon atom and which are the reaction products of oligomers or copolymers of an aliphatic diamino acid having 3 to 10 carbon atoms, such as lysine, a chain-extender such as epichlorohydrin, a dihalide or an aliphatic diepoxide, an amino-reactive allyl compound, and a perfluoroalkyl iodide.

A class of non-polymeric amphoteric compounds which contain $R_F$-, acid and amino groups, and which are useful to impart oil repellency to paper products are di-$R_F$-ramino acids obtained by reaction of an amino acid, allyl glycidyl ether and an $R_F$-iodide as described in U.S. Pat. No. 5,491, 261. However, these compounds are not oligomers or polymers.

It has now been discovered that by a similar synthetic route, polymeric $R_F$-amino acids of the type which are useful as foam stabilizers for polar solvent fire-fighting foams, and which contain a plurality of $R_F$ groups as well as amino, and carboxy or other hydrophilic groups, can conveniently be prepared in similarly high yields and essentially without waste from (A) an aliphatic diamino acid having 3 to 10 carbon atoms such as lysine, (B) a chain extender such as epichlorohydrin, a dihalide or a diepoxide, (C) an amino-reactive allyl compound and (D) a perfluoroalkyl iodide, and, optionally, other reactants.

The resulting mixture of poly-perfluoroalkyl-allyl- and poly-perfluoroalkyl-iodopropyl-substituted-polyamino acids are useful as grease-proofing agents for paper, but more importantly, they have been found to act as excellent foam stabilizers for Aqueous Fire-Fighting Foam (AFFF) formulations used on polar solvent fires.

DETAILED DISCLOSURE

The novel perfluoroalkyl-substituted polyamino acid of the present invention comprises an oligomer or copolymer of an aliphatic diamino carboxylic acid having 3 to 10 carbon atoms and containing at least two perfluoroalkyl groups attached to nitrogen atoms through a linking group.

More particularly, the perfluoroalkyl-substituted polyamino acid comprises an oligomer or polymer of an aliphatic diamino carboxylic acid having 3 to 10 carbon atoms and containing at least two structural units, J, having perfluoroalkyl groups, $R_F$, attached to nitrogen atoms of the oligomer or copolymer through a linking group L, wherein J is a mixture of

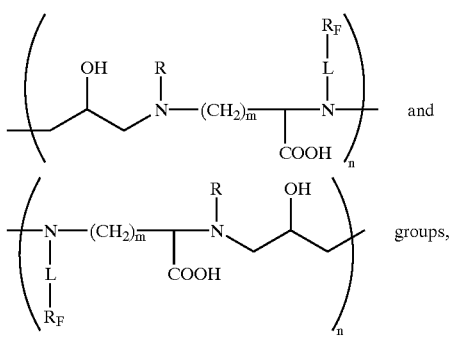

L is —Q—CH$_2$—CH=CH— and/or —Q—CH$_2$—CHI—CH$_2$—, in which
Q is CH$_2$—CHOH—CH$_2$O, (C=S)—NH or a direct bond, $R_F$ is a monovalent perfluorinated alkyl or alkenyl group,
R is hydrogen or an ionic or nonionic water-solubilizing group,
m is an integer from 1 to 8 and
n is an integer from 2 to 100.

Preferably Q is —CH$_2$—CHOH—CH$_2$—O— or a direct bond. It is most preferably —CH$_2$—CHOH—CH$_2$—O—.

Each $R_F$ is independently a monovalent perfluorinated alkyl or alkenyl, linear or branched organic radical having four to twenty fully fluorinated carbon atoms. Preferably $R_F$ is saturated and contains 6–12 carbon atoms, is fully fluorinated and contains at least one terminal perfluommethyl group. Most preferably $R_F$ is a —$C_6F_{13}$ group.

R is preferably hydrogen. When R is an ionic water-solubilizing group, it is preferably a carboxy-, phosphate-, sulfate- sulfonate- or quaternary ammonium-containing group. When R is a nonionic water-solubilizing group, it is preferably an amide-, tertiary amino- or poly-(oxyethylene)-containing group.

The number of methylene repeating units, m, is preferably 1–5. Most preferably m is 4.

Advantageously the novel oligomer or copolymer has a weight average molecular weight of from about 500 to 100,000 as determined by conventional techniques such as gel permeation chromatography.

The perfluoroalkyl-substituted polyamino acids of the present invention are reaction products of (A) an aliphatic diamino acid having 3 to 10 carbon atoms, (B) an amino-reactive chain extender such as epichlorohydrin, a dihalide or a diepoxide, (C) allyl glycidyl ether, allyl chloride or bromide, or allyl isothiocyanate and (D) a perfluoroalkyl iodide, and, optionally (E) an amino acid other than (A), a monoglycidyl compound other than allyl glycidyl ether or an aliphatic or aromatic amine or diamine, and also, optionally, (F) an amino-reactive organic or inorganic compound selected from halogenated carboxylic- or sulfonic acids or their salts, vinyl unsaturated acids, anhydrides and glycidol and chloroacetamide.

Suitable aliphatic diamino acid starting materials for use in the present invention have 2 primary amino groups attached to a carboxylic acid-containing radical containing 3 to 10 carbon atoms, which radical can be linear or branched. Preferably it is linear. Advantageously the amino groups are at the ends of a linear chain with a carboxylic acid radical and an amino radical bonded to the same carbon atom. Thus, most preferably the diamino acid is of the formula

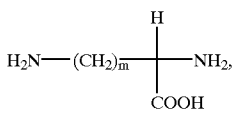

where m is an integer from 1 to 8. The number of methylene repeating units, m, is preferably 1–5. Most preferably m is 4. Preferred diamino acids include 2,3-diaminopropionic acid, 2,4-diaminobutyric acid, 2,5-diaminopentanoic acid (omithine), 2,6diaminohexanoic acid (lysine) and 2,7-diaminoheptanoic acid. Especially preferred are 2,5diaminopentanoic acid (omithine) and 2,6-diaminohexanoic acid (lysine), with lysine being most especially preferred.

Omithine and lysine are naturally occurring readily available amino acids. Other suitable aliphatic diamino acid starting materials are either known per se or can be made by known methods.

Preferred compounds (B) are epichlorohydrin, 1,2-dichloroethane, 1,4-dichlorobutane, 1,3-dichloro-2-hydroxypropane, α,α'-dichloro-p-xylene, butanediol digylcidyl ether and N,N-digylcidylaniline, with epichlorohydrin being especially preferred.

Preferred compound (C) is allyl glycidyl ether.

Preferred compounds (E) are glycine, glucosamine and glycidyl trimethylammonium chloride, with glycidyl trimethylammonium chloride being most preferred.

Preferred compounds (F) are halogenated acids such as chloroacetic acid, chloropropionic acid and chlorosulfonic acid and their salts, unsaturated acids such as acrylic acid, itaconic acid, vinyl sulfonic acid and vinyl phosphonic acid, 2-acrylamido-2-methylpropane sulfonic acid and 2-acrylamido glycolic acid, anhydrides such as maleic-, succinic- phthalic- and acetic anhydrides and sodium metatriphosphate. Most preferred are chloroacetic acid, chloroacetamide and sodium meta-triphosphate.

The novel compounds are the reaction products of (A), (B), (C), (D), (E) and (F) which are preferably reacted in molar ratios of (A) 1/(B)0.2–0.99/(C)0.15–0.6/(D)0.15–0.5/(E)0–0.2/(F) 0–0.2.

Especially preferred compounds are the reaction products wherein the molar ratios are (A)1/(B)0.6–0.95/(C)0.25–0.4/(D)0.2–0.35/(E)0–0.1/(F) 0–0.1, wherein (E) is glycine or glycidyl trimethylammonium chloride and (F) is chloroacetic acid, chloroacetamide or sodium-trimetaphosphate.

The most preferred compounds are the reaction products wherein the molar ratios are (A)1/(B)0.7–0.95/(C)0.27–0.33/(D)0.25–0.3.

The novel perfluoroalkyl-substituted polyamino acids of this invention are preferably obtained by first reacting an aliphatic diamino acid having 3 to 10 carbon atoms with an amino-reactive chain extender, for example epichlorohydrin, a dihalide or an aliphatic diepoxide, in the presence of an acid acceptor, secondly reacting the intermediate polyamino acid with an amino-reactive allyl compound which is preferably selected from the group consisting of allyl glycidyl ether (AGE), allyl chloride or allyl bromide or with allyl isothiocyanate, then reacting the polyallyl-substituted polyamino acid with a perfluoroalkyl iodide in the presence of a free radical initiator such as an azo compound or peroxide at an appropriate initiation temperature, preferably at temperatures of between 50 and 80° C. Sodium metabisulfite is preferably present during this step to reduce iodine. Alternatively, one can first react the aliphatic diamino acid having 3 to 10 carbon atoms with an amino-reactive allyl compound such as allyl glycidyl ether; then react this product with a perfluoroalkyl iodide and finally react this product with the chain-extending epichlorohydrin, dihalide or diepoxide. However the properties of the resulting perfluoroalkyl-substituted polyamino acids differ somewhat from those prepared by the first route.

The addition of a perfluoroalkyl iodide to an allyl compound may be carried out according to the process described in U.S. Pat. No. 5,585,517. Solvents can be present, for example ketones such as acetone, methyl ethyl ketone or methyl propyl ketone or alcohols such as ethanol, propanol or butanol. If a solvent is used, it is preferably distilled off before dilution of the reaction mixture with water. The reaction is typically carried out over 4 to 10 hours at 50–80° C. with good agitation. Any remaining amino groups can be further reacted with suitable reagents (E) or (F), either before or after addition of the perfluoroalkyl iodide, to introduce functional groups such as additional acid or amino groups.

Due to the basic nature of the reaction medium, much of the organic iodide is eliminated during the course of the reaction of the perfluoroalkyl iodide. The product obtained is therefore a mixture of halogenated and dehydrohalogenated species. If complete dehydrohalogenation is desired, the addition of a strong inorganic base such as sodium or potassium hydroxide or a strong organic base such as 1,8-diazabicyclo(5.4.0)-undec-7-ene (DBU) is necessary.

It has further been found that the addition of a periluoroalkyl iodide to an allyloxy group can be carried out using catalytic amounts of sodium dithionite at temperatures between 0 and 200° C., as disclosed in copending U.S. patent application Ser. No. 60/084,815. An advantage of this process is that less color is produced and the process can be carried out at higher aqueous dilutions.

The final product mixture is then diluted, if desired, with sufficient deionized water to adjust the solids content to 15 to 50% and the fluorine c ontent to 4 to 10%. Thus another aspect of the present invention is an essentially aqueous solution comprising 15 to 50% of an oligomer or copolymer of an aliphatic diamino acid having 3 to 10 carbon atoms and containing at least two perfluoroalkyl groups attached to nitrogen atoms through a linking group. This aqueous solution is useful in the preparation of foam stabilizers and for treating paper.

When the compounds of this invention are used to improve the oil repellency of paper, they are applied to the paper or paper board as an external coating by any conventional method, such as padding or spraying, or in a size press in amounts to deposit from 0.02 to 0.5% fluorine by weight on the paper. In addition to the fluorochemical, an y of the conventional binders used in the paper industry—such as polymeric latex binders, caboxymethyl cellulose and polyvinyl alcohol—and sizing agents, such as ionic and nonionic starches such as ethoxylated and oxidized starches, and water sizing agents such as alkyl ketene dimer (AKD) or alkylsuccinic anhydride (ASA) can be employed.

In the following examples, external sizing application was accomplished using the following procedure: the products were applied to 34# watedeaf paper stock using a Wemer Mathis laboratory padder in the horizontal mode. Samples were co-applied with 2% Penford 280 starch as sizing agent and Chel® DPTA 41 (from Ciba Specialty Chemicals Corp.) as a chelating agent in the standard manner. The paper was dried for 30 seconds on each side at 100° C. using a photographic drier.

The oil repellency of a surface is determined by using the TAPPI UM 557 OIL KIT TEST. This test method consists of applying twelve different mixtures of castor oil/heptane/toluene having a surface tension range from 34.5 to 22.0 dynes/cm. The rating is based on penetration that occurs within 15 seconds of application; the ratings go from 1 (lowest), to 12.

As taught in column 2 of U.S. Pat. No. 5,496,475, the teachings of which are incorporated by reference, AFFF and AR-AFFF agents are generally sold in the form of liquid concentrates. These concentrates, which are rather complex mixtures (see column 7, lines 9–36), are diluted with fresh or salt water in proportioning equipment and sprayed onto a burning liquid as a foam.

The agents are usually sold as so-called "3×6" and "3×3" AR-AFFF concentrates, with the trend in the industry being toward the latter, where the numbers indicate the percent by weight of the concentrate contained in the diluted formulation for a fighting a fire involving a nonpolar fuel such as gasoline and a polar fuel, respectively. Thus a "3×3" AR-AFFF concentrate can be employed at the 3 percent level to combat a fire involving either a nonpolar or a polar fuel.

When the inventive compounds are used as a foam stabilizer in an AR-AFFF agent, they are added to conventional AFFF and AR-AFFF formulations. The performance of an AR-AFFF formulation can be improved by replacing, entirely or in part, a conventional foam stabilizer by at least one inventive compound. In addition a conventional AFFF formulation can be converted into an AR-AFFF agent by incorporating an effective amount of an inventive compound therein.

The amount of the foam stabilizer typically used in 3×3 AR-AFFF agents ranges from 1% to 3% by weight of the active ingredients. From 10 up to about 40% of the fluorine of the final formulation is thus derived from the foam stabilizer.

The novel foam stabilizers of this invention exhibit superior performance when compared to products of the prior art, especially on hot acetone.

In order to test the efficacy of the novel foam stabilizers, the following basic AR-AFFF formulation, free of any foam stabilizer, was used:

| | |
|---|---|
| Lodyne ® F-408R, from Ciba Specialty Chemicals | 3.0% |
| Mirataine ® H2C-HA, from Rhone-Poulenc | 16% |
| Sipex ® OLS, from Alcolac | 1.8% |
| Triton ® X-102, from Rohm & Haas Comp. | 0.84% |
| Butyl carbitol | 10% |
| Keltrol ® K1A122, from Kelco Comp. | 0.75% |

This mixture is referred to in the examples as AR-AFFF base.

Measurements of Foam Expansion Ratio (FXR) and Quarter Drain Time (QDT) were performed using the following procedure. A 3% solution of AR-AFFF was prepared in sea or tap water. The test solution was drawn into the calibrated liquid container by vacuum. The volume of the test solution was adjusted to 100 ml. The test solution was pressurized to 40 psig with compressed nitrogen. Compressed air was turned on and adjusted to 33 psig. The test solution was mixed with air at the mixing port before foaming at the nozzle. The volume of foam was measured in a 1000 ml. graduated cylinder. The Foam Expansion Ratio of the foam was determined as the ratio of the total foam volume to the volume of the original test solution. Quarter Drain Time was measured as the time it took to collect 25 ml. of drained liquid (=one quarter of the test solution) from the foam. Each test measurement was duplicated and the average was reported.

Foam Life on hot 2-propanol was measured using the following procedure. A 3% solution of AR-AFFF was prepared in sea or tap water. The test solution was loaded in the calibrated liquid container by using vacuum. The volume of the test solution was adjusted to 75 ml. The test solution was pressurized to 40 psig with compressed nitrogen. Compressed air was turned on at 33 psig. The test solution was mixed with air at the mixing port before foaming at the nozzle. To a glass Pyrex pan 6.5 inches×10 inches was added 250 ml. of 2-propanol at 70° C. The test solution was discharged as foam onto the hot 2-propanol and formed a blanket completely covering its surface. Foam Life was measured as the time it took for 50% of the foam area to collapse. Each test measurement was duplicated and the average was reported.

Analytical Methods

Progress of the reaction of allyl glycidyl ether with the lysine derivative was followed by gas chromatography. The reaction was allowed to continue until allyl glycidyl ether was no longer detected.

ZONYL® TELA-L consumption was also followed by gas chromatography using an HP 5890 GC with FID detector and a Supelco SPB-1, 60 mesh/0.53 mm by 3.0 m column.

Determination of Ionic Chloride and Iodide was done by titration as described below: Equipment: Brinkmann Auto Titrator, Model E438; Fisher Ag/AgCl Reference Electrode; Fisher Silver Billet Indicating Electrode; Aldrich Standard AgCl. Procedure: 1) Weigh about a 0.2 g sample for chloride or 1.0 g for iodide into a 200 ml beaker and dilute with 150 ml of water and add 1 ml of glacial acetic acid. 2) Titrate with 0.1023 M $AgNO_3$ at 750 mv and a speed of "2".

Calculation:

% Conversion (based on $Cl^-$) =
$$\frac{ml \times M \times (\text{Total } Rxn \text{ Mass}) \times 100\%}{(g \text{ sample})(\text{mmol of Chloroacetic acid})}$$

% Conversion (based on $I^-$) = $\frac{ml \times M \times (\text{Total } Rxn \text{ Mass}) \times 100\%}{(g \text{ sample})(\text{mmol of } R_F I)}$ The following examples illustrate various embodiments of the invention, and are not to be interpreted as limiting the scope of the appended claims. In the examples, all parts are by weight unless otherwise specified. Perfluoroalkyl iodides $C_nF_{2n+1}$—I with n=4 to 14 were obtained from DuPont under the product names ZONYL® TELA-L and ZONYL® TELA-N. They have the following average telomer distributions:

ZONYL TELA-L: $C_4$=4% maximum, $C_6$ 50=±3%, $C_8$ 29=±2%, $C_{10}$ 11=±2%, $C_{12}$=4±1%, $C_{14}$ and higher=2% maximum.

ZONYL TELA-N: $C_6$=6% max, $C_8$ 50=±3%, $C_{10}$ 29=±2%, $C_{12}$=11±1%, $C_{14}$ and higher=4% maximum, respectively.

Examples 1 and 2 illustrate the use of a diepoxide chain-extender.

EXAMPLE 1

A: Synthesis of lysine—Allyl Glycidyl Ether (AGE) Adduct 10.0 g (54.7 mmol) of lysine monohydrochloride and a 31.8% NaOH solution (5.0 g of deionized water/8.75 g 50% NaOH) are placed into a round-bottomed flask equipped with a stirrer, nitrogen inlet and a thermoregulator. This mixture is heated with stirring. When a temperature of 650° C. is reached, 6.25 g (54.7 mmol) allyl glycidyl ether (AGE) is added over a one hour period. The reaction mixture is then stirred for two hours at 65° C., after which time the reaction is complete as determined by gas chromatography. This product is obtained as a clear yellow solution of 62.5% solids by weight.

B: Addition of $R_F$-iodide 30.0 g (54.7 mmol lysine) of the product from Example 1A are placed into a round-bottomed flask equipped with a stirrer, nitrogen inlet and a thermoregulator and heated. The temperature is then raised to 80° C., and 29.27 g (49.2 mmol) of perfluoroalkyl iodide (ZONYL TELA-N) and 1.04 g (5.47 mmol) of sodium metabisulfite are added along with 0.42 g (2.19 mmol) of 2,2'-azobisisobutyronitrile (AIBN). Stirring is continued for five hours at 80° C. After five hours conversion of $R_F$-iodide, as determined by gas chromatography, is >95%. The product is a viscous brown mixture of 81.4% solids by weight and 29.4% F.

C: Reaction with Diepoxide 30.0 g (7.93 mmol lysine) of the product from Example 1B are placed into a round-bottomed flask equipped with a stirrer, nitrogen inlet and a thermoregulator and heated. When the temperature reaches 40° C., 1.48 g (4.36 mmol) of 1,4-butanediol diglycidyl ether (60% from Aldrich), and 5.0 g of deionized water are added to the flask. A temperature increase from 40° C. to 55° C. is observed. When the rise in temperature subsides, the reaction mixture is maintained at 55° C. for three hours with stirring, after which time the reaction is complete as determined by gas chromatography. The poly ($R_F$-amino acid) is obtained as a cloudy brown viscous mass with 24.2% F.

EXAMPLE 2

10.0 g (54.7 mmol) of lysine monohydrochloride and 11.75 g of a 37.2% NaOH solution are placed into a round-bottomed flask equipped with a stirrer, nitrogen inlet and a thermo-regulator. This mixture is heated with stirring. When a temperature of 65° C. is reached, a mixture of 1.87 g (16.4 mmol) allyl glycidyl ether and 9.26 g (27.3 mmol) of 1,4-butanediol diglycidyl ether (60% from Aldrich), are added over a one hour period. The reaction mixture is then stirred for two hours at 65° C., after which time the reaction is complete as determined by gas chromatography. The temperature is then raised to 80° C., and 8.79 g (14.7 mmol) of perfluoroalkyl iodide (ZONYL TELA-N) and 0.28 g (1.47 mmol) of sodium metabisulfite are added along with 0.11 g (0.57 mmol) of 2,2'-azobisisobutyronitrile (AIBN). After one hour, 3.5 g of deionized water is added to lower the viscosity of the mixture. Stirring is continued for five hours at 80° C. Conversion of $R_F$-iodide, as determined by gas chromatography, is 90%. After five hours the mixture is cooled to room temperature and 50 g of water is added to adjust the solids to 30.4%, and 5.6% F.

EXAMPLE 3

A: Synthesis of Poly-alloxy Amino Acid with Maleic Anhydride 10.0 g (54.7 mmol) of lysine monohydrochloride and 13.75 g of a 31.8% NaOH solution are placed into a round-bottomed flask equipped with a stirrer, nitrogen inlet and a thermo-regulator. This mixture is heated with stirring. When a temperature of 65° C. is reached, a predissolved mixture of 4.47 g (46.0 mmol) of maleic anhydride in 5.0 g of tetramethylsulfone is added to the mixture. After one hour, 1.65 g (14.46 mmol) allyl glycidyl ether are added. The reaction mixture is then stirred for two hours at 65° C., after which time the reaction is complete as determined by gas chromatography. After two hours the mixture is cooled to room temperature and discharged as a cloudy white viscous paste of 73.6% solids.

B: Addition of $R_F$-iodide 13.9 g (35.56 mmol lysine) of the polymer from Example 3A is placed into a round-bottomed flask equipped with a stirrer, nitrogen inlet and a thermoregulator. To this round-bottomed flask is added 0.71 g (6.23 mmol) of allyl glycidyl ether. The reaction mixture is heated to 65° C. and stirred for three hours. At the end of three hours, the temperature is then raised to 80° C., and 2.84 g (5.59 mmol) of perfluoroalkyl iodide (ZONYL TELA-L) and 0.1 g (0.53 mmol) of sodium metabisulfite are added along with 0.04 g (0.21 mmol) of 2,2'-azobisisobutyronitrile (AIBN). The stirring is continued for five hours at 80° C. Conversion of $R_F$-iodide, as determined by gas chromatography, is >95%. After three hours the mixture is cooled to room temperature and 10 g of water is added to adjust the solids of the viscous brown product to 50.3%, and 5.9% F.

EXAMPLE 4

Synthesis with Dichloroethane 10.0 g (54.7 mmol) of lysine monohydrochloride and 8.75 g 50% NaOH are placed into a round-bottomed flask equipped with a stirrer, nitrogen inlet and a thermoregulator. This mixture is heated gently with stirring. When a temperature of 50° C. is reached, a mixture of 2.34 g (20.5 mmol) allyl glycidyl ether and 2.71 g (27.37 mmol) of 1,2-dichloroethane, both from Aldrich, are added over a five minute period. The reaction mixture is then stirred for two hours at 65° C., after which time the reaction is complete as determined by gas chromatography. The temperature is then raised to 80° C., and 9.38 g (18.46 mmol) of perfluoroalkyl iodide (ZONYL TELA-N) and 1.04 g (5.47 mmol) of sodium metabisulfite are added along with 0.42 g (2.1 mmol) of 2,2'-azobisisobutyronitrile (AIBN). The stirring is continued for five hours at 80° C. After five hours the mixture is cooled to room temperature. Conversion of $R_F$-iodide, as determined by gas chromatography, is 97%. After three hours the mixture is cooled to room temperature and 30 g of water is added to adjust the solids of the brown product to 43.6%, and 8.5% F.

EXAMPLE 5

A: Reaction of Lysine with Epichlorohydrin 50.0 g (273.3 mmol) of lysine monohydrochloride and 121 of a 19.0% NaOH solution are placed into a round-bottomed flask equipped with a stirrer, nitrogen inlet and a thermo-regulator. This mixture is heated with stirring. When a temperature of 65° C. is reached, 20.3 g (218.9 mmol) of epichlorohydrin are added over a thirty minute period. The reaction mixture is then stirred for three hours at 65° C., after which time the reaction is complete as determined by gas chromatography. This product is not isolated but used directly in the next step.

B: Reaction with AGE and $R_F$-iodide 19.1 g (27.37 mmol lysine) of the polymer from Example 5A is placed into a round-bottomed flask equipped with a stirrer, nitrogen inlet and a thermoregulator. To this round-bottomed flask is added 0.75 g (6.57 mmol) of allyl glycidyl ether. The reaction mixture is heated to 65° C. and stirred for three hours. At the end of three hours, 3.0 g (5.89 mmol) of ZONYL TELA-L is added to the reaction mixture along with 0.25 g (1.2 mmol) of sodium hydrosulfite, 2.5 g of hexylene glycol and 10.0 g deionized water. The reaction mixture is stirred under nitrogen at 15–20° C. for three hours. Conversion of $R_F$-iodide, as determined by gas chromatography, is 90%. The product is a viscous brown mixture of 39.6% solids by weight and 4.3% F.

EXAMPLE 6

Using the same procedure as described in Example 5B, 19.1 g (27.3 mmol lysine) of the polymer from Example 5A are reacted with 0.94 g (8.19 mmol) of allyl glycidyl ether. The reaction mixture is then cooled to 10° C. and 2.0 g (25 mmol) of sodium hydroxide is added. Then 3.3 g (7.4 mmol) of perfluorohexyl iodide are added to the reaction mixture along with 0.6 g (2.75 mmol) of sodium hydrosulfite, 2.5 g of hexylene glycol and 15.0 g deionized water. The reaction mixture is stirred under nitrogen at 15–20° C. for three hours. Conversion of $R_F$-iodide, as determined by gas chromatography, is >98%. The product is a clear brown mixture having 30.6% solids by weight and 4.2% F.

EXAMPLE 7

A: Reaction of Lysine and Glycine with Epichlorohydrin 50.0 g (273.3 mmol) of lysine monohydrochloride and 4.1 g (54.7 mmol) of glycine along with 123 g of a 19.6% NaOH solution are placed into a round-bottomed flask equipped with a stirrer, nitrogen inlet and a thermoregulator. This mixture is heated with stirring. When a temperature of 65° C. is reached, 20.3 g (218.9 mmol) of epichlorohydrin are added over a thirty minute period. The reaction mixture is then stirred for three hours at 65° C., after which time the reaction is complete as determined by gas chromatography. This product is not isolated but used directly in the next step.

B: Reaction with AGE 57.4 g (79.5 mmol lysine) of the polymer from Example 7A is placed into a round-bottomed flask equipped with a stirrer, nitrogen inlet and a thermoregulator. To this round-bottomed flask is added 2.81 g (24.6 mmol) of allyl glycidyl ether. The reaction mixture is heated to 65° C. and stirred for three hours. Some of this product is isolated for the next step.

C: Reaction with $R_F$-iodide 19.1 g (27.37 mmol lysine) of the polymer from Example 7B is placed into a round-bottomed flask equipped with a stirrer, nitrogen inlet and a thermoregulator. Then 3.76 g (7.38 mmol) of ZONYL TELA-L is added to the reaction mixture along with 0.32 g (1.56 mmol) of sodium hydrosulfite, 2.5 g of hexylene glycol and 8.0 g deionized water. The reaction mixture is stirred under nitrogen at 15–20° C. for three hours. Conversion of $R_F$-iodide, as determined by gas chromatography, is >97%. The product is a clear brown mixture of 37.9% solids by weight having 5.4% F.

EXAMPLE 8

A: Reaction of Lysine with Epichlorohydrin 30.0 g (164.0 mmol) of lysine monohydrochloride and 74 g of a 19.5% NaOH solution are placed into a round-bottomed flask equipped with a stirrer, nitrogen inlet and a thermoregulator. This mixture is heated with stirring. When a temperature of 65° C. is reached, 12.91 g (139.6 mmol) of epichlorohydrin are added over a thirty minute period. The reaction mixture is then stirred for three hours at 65° C., after which time the reaction is complete as determined by gas chromatography. This product is obtained as a clear yellow solution of 43.9% solids by weight.

B: Reaction with Allyl Glycidyl Ether 38.0 g (54.7 mmol lysine) of the product from Example 8A are placed into a round-bottomed flask equipped with a stirrer, nitrogen inlet and a thermoregulator. To this round-bottomed flask is added 1.87 g (16.39 mmol) of allyl glycidyl ether. The reaction mixture is heated to 65° C. and stirred for three hours. Some of this polymer is isolated for the next step.

C: Reaction with $R_F$-iodide 19.9 g (27.35 mmol) of the product from Example 8B is placed into a round-bottomed flask equipped with a stirrer, nitrogen inlet and a thermoregulator. Then 2.0 g (25 mmol) of sodium hydroxide and 3.29 g (7.38 mmol) of perfluorohexyl iodide is added to the reaction mixture along with 0.6 g (2.74 mmol) of sodium hydrosulfite, 5.0 g of hexylene glycol and 2.2 g deionized water. The reaction mixture is stirred under nitrogen at 15–20° C. for three hours. Conversion of $R_F$-iodide, as determined by gas chromatography, is >99%. The product is a clear brown mixture containing 41.1% solids by weight and 5.5% F.

EXAMPLE 9

The procedure of example 8C is repeated, but using 3.76 g (7.38 mmol) of perfluorohexyl iodide along with 0.18 g (0.88 mmol) of sodium hydrosufite, 4.0 g of hexylene glycol and 8.2 g deionized water. The reaction mixture is stirred under nitrogen at 15–20° C. for three hours. Conversion of $R_F$-iodide, as determined by gas chromatography, is >97%. The product is a clear brown mixture having 36.6% solids by weight and 6.0% F.

EXAMPLE 10

The procedure of Example 8B and 8C is repeated, but using 1.22 g (10.6 mmol) of allyl glycidyl ether and 4.28 g (9.6 mmol) of perfluorohexyl iodide along with 0.18 g (0.88 mmol) of sodium hydrosulfite, 6.5 g of hexylene glycol and 3.0 g deionized water. The reaction mixture is stirred under nitrogen at 15–20° C. for three hours. Conversion of $R_F$-iodide, as determined by gas chromatography, is >92%. The product is a clear brown mixture of 40.9% solids by weight and 6.9% F.

EXAMPLE 11

A: Reaction of Lysine with Epichlorohydrin 50.0 g (273.3 mmol) of lysine monohydrochloride and 123 g of a 19.6% NaOH solution are placed into a round-bottomed flask equipped with a stirrer, nitrogen inlet and a thermoregulator. This mixture is heated with stirring. When a temperature of 65° C. is reached, 22.79 g (246.3 mmol) of epichlorohydrin are added over a thirty minute period. The reaction mixture is then stirred for three hours at 65° C., after which time the reaction is complete as determined by gas chromatography. The product is a clear, yellow solution having 42.4% solids.

B: Reaction with AGE 60.2 g (84.0 mmol) of the product from Example 11A is placed into a round-bottomed flask equipped with a stirrer, nitrogen inlet and a thermoregulator. To this round-bottomed flask is added 2.94 g (25.8 mmol) of allyl glycidyl ether. The reaction mixture is heated to 65° C. and stirred for three hours. Some of this polymer is isolated for the next step.

C: Reaction with $R_F$-iodide 19.1 g (27.3 mmol) of the product from Example 11B are placed into a round-bottomed flask equipped with a stirrer, nitrogen inlet and a thermoregulator. The reaction mixture is cooled to 10° C. and 3.76 g (7.38 mmol) of ZONYL TELA-L are added to the reaction mixture along with 0.25 g (1.2 mmol) of sodium hydrosulfite, 2.5 g of hexylene glycol and 7.0 g deionized water. The reaction mixture is stirred under nitrogen at 15–20° C. for three hours. Conversion of $R_F$-iodide, as determined by gas chromatography, is >97%. The product is a clear brown mixture containing 29.5% solids by weight and 4.75% F.

EXAMPLES 12–14

The procedure of Example 11C is repeated using the following charges of $R_F$-iodide:

| Example No. | $R_F$-iodide | grams | mmols | Solids % F |
|---|---|---|---|---|
| 12 | ZONYL TELA-L | 3.34 | 6.68 | 33.7/4.9 |
| 13 | Perfluorohexyl iodide | 3.3 | 7.4 | 41.6/5.9 |
| 14 | ZONYL TELA-N | 4.37 | 7.3 | 30.9/4.7 |

EXAMPLE 15

Reaction with Allyl Isothiocyanate 19.1 g (27.3 mmol) of the polymer from Example 11A are placed into a round-bottomed flask equipped with a stirrer, nitrogen inlet and a thermoregulator. To this round-bottomed flask is added 0.85 g (8.16 mmol) of allyl isothiocyanate (from Aldrich). The reaction mixture is heated to 65° C. and stirred for three hours. After three hours the reaction mixture is cooled to 10° C. and 2.0 g (25.0 mmol) of sodium hydroxide is added. Then 3.74 g (7.3 mmol) of ZONYL TELA-L is added to the reaction mixture along with 0.6 g (2.75 mmol) of sodium hydrosulfite, 2.5 g of hexylene glycol and 10.0 g deionized water. The reaction mixture is stirred under nitrogen at 15–20° C. for three hours. Conversion of $R_F$-iodide, as determined by gas chromatography, is >98%. The product is a clear amber mixture having 34.8% solids by weight and 5.5% F.

EXAMPLE 16

(27.3 mmol) of the polymer from Example 11A is placed into a round-bottomed flask equipped with a stirrer, nitrogen inlet and a thermoregulator. To this round-bottomed flask is added 1.22 g (10.69 mmol) of allyl glycidyl ether. The reaction mixture is heated to 65° C. and stirred for three hours. After three hours the reaction mixture is cooled to 10° C. and 2.0 g (25.0 mmol) of sodium hydroxide was added. Then 4.89 g (9.6 mmol) of ZONYL TELA-L is added to the reaction mixture along with 0.6 g (2.75 mmol) of sodium hydrosulfite, 6.5 g of hexylene glycol and 10.0 g deionized water. The reaction mixture is stirred under nitrogen at 15–20° C. for three hours. The conversion of $R_F$-iodide, as determined by gas chromatography, is >98%. The product is a clear amber mixture containing 35.2% solids by weight and 6.5% F. The compositions of Examples 1–16 are summarized below.

TABLE 1

| Ex. No. | Mol Ratio of Lysine/XL* | | Reactant eq. | | Ratio of Ly/XL*/AGE/$R_F$ in product | % F in actives |
|---|---|---|---|---|---|---|
| | Ly | XL | AGE | $R_FI$ | | |
| 1 | 1 | 0.55[4] | 1 | 0.9[1] | 1/0.55/1.0/0.9 | 24.2 |
| 2 | 1 | 0.5[4] | 0.3 | 0.27[1] | 1/0.5/0.3/0.27 | 5.6 |
| 3 | 1 | 0.85[5] | 0.18 | 0.16[1] | 1/0.85/0.18/0.16 | 5.9 |
| 4 | 1 | 0.5[6] | 0.38 | 0.34[1] | 1/0.5/0.38/0.338 | 8.5 |
| 5 | 1 | 0.8[7] | 0.3 | 0.24[2] | 1/0.8/0.3/0.24 | 4.3 |
| 6 | 1 | 0.8[7] | 0.3 | 0.27[2] | 1/0.8/0.3/0.27 | 4.2 |
| 7 | 1.1 | 0.8[7] | 0.3 | 0.27[2] | 1/(0.2[8])/0.8/0.3/0.27 | 5.4 |
| 8 | 1 | 0.85[7] | 0.3 | 0.27[3] | 1/0.85/0.3/0.27 | 5.5 |
| 9 | 1 | 0.85[7] | 0.3 | 0.27[2] | 1/0.85/0.3/0.27 | 6.0 |
| 10 | 1 | 0.85[7] | 0.4 | 0.36[3] | 1/0.85/0.4/0.36 | 6.9 |
| 11 | 1 | 0.9[7] | 0.3 | 0.27[2] | 1/0.9/0.3/0.27 | 4.75 |
| 12 | 1 | 0.9[7] | 0.3 | 0.2[2] | 1/0.9/0.3/0.2 | 4.9 |
| 13 | 1 | 0.9[7] | 0.3 | 0.27[3] | 1/0.9/0.3/0.27 | 5.9 |
| 14 | 1 | 0.9[7] | 0.3 | 0.27[1] | 1/0.9/0.3/0.27 | 4.7 |
| 15 | 1 | 0.9[7] | 0.3[9] | 0.27[2] | 1/0.9/0.3/0.27 | 5.5 |
| 16 | 1 | 0.9[7] | 0.4 | 0.36[2] | 1/0.9/0.4/0.36 | 6.5 |

*Ly = lysine; XL = chain extender
[1] ZONYL TELA-N
[2] ZONYL TELA-L
[3] perfluorohexyl iodide
[4] 1,4 butanediol diglycidyl ether
[5] maleic anhydride
[6] dichloroethane
[7] epichlorohydrin
[8] glycine
[9] allyl isothiocyanate

EXAMPLE 17

Performance of Foam Stabilizers of Examples 5–16 with Sea Water (0.8% F in Formulation)

The efficacy of foam stabilizers was determined by preparing an AR-AFFF concentrate by blending the AR-AFFF base formulation at the 0.6% F level with the foam stabilizers of Examples 5–16 at the 0.2% F level. Foam Expansion Ratio, Quarter Drain Time and Foam Life on hot 2-propanol and acetone were determined using 3% premix in salt water. A commercial foam stabilizer, DYNAX 5011 (Dynax Corp), and an AR-AFFF base sample without foam stabilizer added were used as controls.

TABLE 2

| Foam Stabilizer Ex. No. | Foam Expansion Ratio | Quarter Drain Time (min) | Foam Life on Hot 2-Propanol (min) | Foam Life on Hot Acetone (min) |
|---|---|---|---|---|
| 5 | 7.3 | 8:00 | 9:0 | 12:30 |
| 6 | 7.3 | 7:11 | 6:15 | 9:23 |
| 7 | 7.0 | 6:49 | 6:39 | 10:00 |
| 8 | 7.5 | 7:00 | 5:31 | 15:11 |
| 9 | 7.1 | 8:00 | 14:58 | 16:16 |
| 10 | 7.4 | 7:35 | 29:39 | >45 |
| 11 | 7.2 | 7:00 | 20:00 | 22:00 |
| 12 | 8.1 | 6:01 | 12:42 | 13:42 |
| 13 | 8.0 | 7:37 | 37:22 | >45 |
| 14 | 6.4 | 7:39 | 3:13 | 9:37 |

TABLE 2-continued

| Foam Stabilizer Ex. No. | Foam Expansion Ratio | Quarter Drain Time (min) | Foam Life on Hot 2-Propanol (min) | Foam Life on Hot Acetone (min) |
|---|---|---|---|---|
| 15 | 7.2 | 7:04 | <1 | 5:23 |
| 16 | 7.3 | 8:04 | 17:27 | 25:0 |
| DYNAX 5011 | 8.4 | 7:41 | 16:00 | 14:03 |
| NONE | 7.4 | 7:00 | 0:15 | 1:15 |

EXAMPLE 18

Performance of Foam Stabilizers of Examples 5–16 with Tap Water (0.8% F in Formulation)

The efficacy of foam stabilizers was determined by preparing an AR-AFFF concentrate by blending the standard AR-AFFF base formulation at the 0.6% F level with the foam stabilizers of Examples 5–16 at the 0.2% F level. Foam Expansion Ratio, Quarter Drain Time and Foam Life on hot 2-propanol and acetone were determined using a 3% premix in tap water. A commercial foam stabilizer, DYNAX 5011, and an AR-AFFF base sample without foam stabilizer added were used as controls.

TABLE 3

| Foam Stabilizer Ex. No. | Foam Expansion Ratio | Quarter Drain Time (min) | Foam Life on Hot 2-Propanol (min) | Foam Life on Hot Acetone (min) |
|---|---|---|---|---|
| 5 | 7.6 | 8:00 | <1 | >60 |
| 6 | 7.2 | 9:21 | <1 | 16:00 |
| 7 | 8.1 | 8:00 | <1 | 34:20 |
| 8 | 7.3 | 8:00 | 2:30 | >45 |
| 9 | 7.1 | 8:00 | 6:15 | >45 |
| 10 | 7.2 | 7:46 | 15:25 | >45 |
| 11 | 8.0 | 8:03 | 6:00 | >45 |
| 12 | 7.9 | 7:20 | <1 | >30 |
| 13 | 7.8 | 8:05 | 25:40 | >45 |
| 14 | 6.5 | 8:17 | <1.0 | 16:15 |
| 15 | 6.1 | 7:45 | <1 | 5:18 |
| 16 | 7.4 | 8:27 | 1:30 | >45 |
| DYNAX 5011 | 8.3 | 8:19 | 12:11 | 20:04 |
| NONE | 8.3 | 8:30 | 0:23 | 18:00 |

The following examples 19–34 describe compounds made with additional hydrophilic reactants.

EXAMPLE 19

A: Reaction of Lysine with Epichlorohydrin and Chloroacetic Acid 10.0 g (54.7 mmol) of lysine monohydrochloride and a 14.5 g of a 31,0% NaOH solution are placed into a round-bottomed flask equipped with a stirrer, nitrogen inlet and a thermo-regulator. This mixture is heated with stirring. When a temperature of 65° C. is reached, 1.52 g (16.4 mmol) of epichlorohydrin are added over a fifteen minute period. The reaction mixture is then stirred for three hours at 65° C. until all epichlorohydrin has reacted, as monitored by gas chromatography. The reaction mixture is cooled to 60° C. When a temperature of 60° C. is reached, 1.87 g (16.4 mmol) allyl glycidyl ether are added over a one hour period. The reaction mixture is then stirred for two hours at 60° C. after which time all the allyl glycidyl ether has reacted, as monitored by gas chromatography. To this mixture are added 18.49 g (158.7 mmol) of sodium chloroacetate over fifteen minutes. The reaction mixture is stirred for three hours at 65° C., after which time reaction of the sodium chloroacetate is complete, as monitored by chloride titration. At the end of three hours, 5.8 g (72.5 mmol) of 50% NaOH was added to the mixture to maintain a pH of 8–9, along with 3.0 g of hexylene glycol and 3.0 g deionized water. Then 7.51 g (14.78 mmol) of ZONYL TELA-L is added to the reaction mixture along with 0.5 g (2.44 mmol) of sodium hydrosulfite. The reaction mixture is stirred under nitrogen at 15–20° C. for three hours. Conversion of $R_F$-iodide, as determined by gas chromatography, is >98%. The product was a clear beige mixture of 65.9% solids by weight and 6.7% F.

EXAMPLE 20–22

The procedure of Example 19 is repeated, but using the amounts of epichlorohydrin (EPI), allyl glycidyl ether (AGE), chloroacetic acid (CAC) and ZONYL TELA-L $R_F$-iodide listed below.

| Example No. | EPI (g/mmol) | AGE (g/mmol) | CAC (g/mmol) | $R_F$-iodide (g/mmol) |
| --- | --- | --- | --- | --- |
| 19 | 1.52/16.4 | 1.87/16.4 | 18.5/159 | 7.5/14.8 |
| 20 | 2.53/27.2 | 1.87/16.4 | 17.2/148 | 7.5/14.8 |
| 21 | 3.55/38.3 | 1.87/16.4 | 15.9/137 | 7.5/14.8 |
| 22 | 3.55/38.4 | 3.74/32.8 | 15.9/137 | 15/29.5 |

EXAMPLE 23

Synthesis of Phosphoric Acid derivative
A: Reaction of lysine with Epichlorohydrin
  50.0 g (273.3 mmol) of lysine monohydrochloride and 121g of 19.0% NaOH solution are placed into a round-bottomed flask equipped with a stirrer, nitrogen inlet and a thermo-regulator. This mixture is heated with stirring. When a temperature of 65° C. is reached, 20.3 g (218.9 mmol) of epichlorohydrin are added over a thirty minute period. The reaction mixture is then stirred for three hours at 65° C., after which time the reaction is complete as determined by gas chromatography.
B: Reaction with Allyl Glycidyl Ether
  60.0 g (85.9 mmol lysine) of the polymer from Example 24A is placed into a round-bottomed flask equipped with a stirrer, nitrogen inlet and a thermoregulator. To this are added 2.81 g (24.6 mmol) of allyl glycidyl ether. The reaction mixture is heated to 65° C. and stirred for three hours, then let to cool to room temperature.
C: Reaction with Trimetaphosphate and $R_F$-iodide
  20.1 g (26.05 mmol lysine) of the polymer from Example 24B is placed into a round-bottomed flask equipped with a stirrer, nitrogen inlet and a thermoregulator. To this round-bottomed flask is added 7.54 g (24.65 mmol) of sodium trimetaphosphate (from Monsanto) over a five minute period. The reaction mixture is heated to 65° C. and stirred for two hours. Then 3.76 g (7.38 mmol) of ZONYL TELA-L is added to the reaction mixture along with 0.25 g (1.22 mmol) of sodium hydrosulfite, 2.5 g of hexylene glycol and 5.0 g deionized water. The reaction mixture is stirred under nitrogen at 15–20° C. for three hours. Conversion of $R_F$-iodide, as determined by gas chromatography, is >99%. The product is a clear amber mixture containing 44.5% solids by weight and 5.8% F.

EXAMPLE 24

The procedure of Example 23 is repeated, but using 3.77 g (12.3 mmol) sodium trimetaphos-phate and 1.15 g (12.3 mmol) 2-chloroacetamide. The product is a clear amber mixture having 55.7% solids by weight and 5.6% F.

EXAMPLE 25

Synthesis of Chloroacetamide Derivative 19.1 g (27.37 mmol lysine) of the polymer from Example 23A is placed into a round-bottomed flask equipped with a stirrer, nitrogen inlet and a thermoregulator. To this round-bottomed flask is added 0.94 g (8.19 mmol) of allyl glycidyl ether. The reaction mixture is heated to 65° C. and stirred for three hours. To this round-bottomed flask is added 2.3 g (24.6 mmol) of 2-chloroacetamide over a five minutes. The reaction mixture is heated to 65° C. and stirred for three hours. At the end of three hours, 3.76 g (7.38 mmol) of ZONYL TELA-L is added to the reaction mixture along with 0.25 g (1.2 mmol) of sodium hydrosulfite, 2.5 g of hexylene glycol and 7.0 g deionized water. The reaction mixture is stirred under nitrogen at 15–20° C. for three hours. Conversion of $R_F$-iodide, as determined by gas chromatography, is >98%. The product is a clear amber mixture of 44.7% solids by weight and 5.8% F.

EXAMPLE 26

Synthesis of Chloroacetic Acid Derivative

Following the procedure of Example 19, a product is synthesized using 10.0 g (54.7 mmol) of lysine monohydrochloride, 24.6 g of a 19.5% NaOH solution, 4.3 g (46.5 mmol) of epichlorohydrin, 3.74 g (32.8 mmol) allyl glycidyl ether and 10.2 g (87.5 mmol) of sodium chloroacetate. To this mixture 1.0 g (12.5 mmol) of 50% NaOH are added, followed by 8.33 g (16.4 mmol) of perfluoroalkyl iodide (ZONYL TELA-L) and 1.0 g (4.9 mmol) of sodium hydrosulfite, then 5.5 g hexylene glycol and 15.0 g of deionized water. Conversion of $R_F$-iodide, as determined by gas chromatography, is >98%. The product is a clear amber mixture having 48.5% solids by weight and 5.8% F.

EXAMPLE 27

Synthesis of a Sorbitol Derivative 30.0 g (164.2 mmol) of lysine monohydrochloride, 10.5 g (58.0 mmol) of 1-amino-1-deoxy-D-sorbitol (both from Aldrich) and a 27.8%? NaOH solution (27.1 g of deionized water/34.0 g 50% NaOH) are placed into a round-bottomed flask equipped with a stirrer, nitrogen inlet and a thermoregulator. This mixture is heated with stirring. When a temperature of 65° C. is reached, 16.09 g (173.9 mmol) of epichlorohydrin are added over a fifteen minute period. The reaction mixture is then stirred for three hours at 65° C. Consumption of epichlorohydrin is monitored by gas chromatography. The reaction mixture is cooled to 60° C. and 6.61 g (57.9 mmol) of allyl glycidyl ether are added over a one hour period. The reaction mixture is then stirred for two hours at 60° C., after which time the reaction is complete as determined by gas chromatography. To this mixture are added 5.0 g (62.5 mmol) of sodium hydroxide to maintain a pH of 8–9. The temperature is then cooled to 10° C., and 19.92 g (39.13 mmol) of perfluoro-alkyl iodide (ZONYL TELA-L) and 3.2 9 (15.6 mmol) of sodium hydrosulfite are added along with 13.3 g hexylene glycol. The stirring is continued for five hours at 20° C. Conversion of $R_F$-iodide, as determined by gas chromatography, is >99%. The product is a clear amber mixture having 54.7% solids by weight and 7.0% F.

EXAMPLE 28

A: Reaction with Epichlorohydrin
  50.0 g (273.3 mmol) of lysine monohydrochloride and 123 g of a 19.6% NaOH solution are placed into a round-bottomed flask equipped with a stirrer, nitrogen inlet and a thermo-regulator. This mixture is heated and stirred. When a temperature of 65° C. is reached, 22.79 g (246.3 mmol) of epichlorohydrin are added over a thirty minute period. The reaction mixture is then stirred for three hours at 65° C., after which time the reaction is complete as determined by gas chromatography.

B: Reaction with Allyl Glycidyl Ether 19.1 g (27.3 mmol lysine) of the polymer from Example 29A is placed into a round-bottomed flask equipped with a stirrer, nitrogen inlet and a thermoregulator. To this round-bottomed flask is added 0.94 g (8.19 mmol) of allyl glycidyl ether. The reaction mixture is heated to 65° C. and stirred for three hours.

C: Reaction with Chloroacetamide and $R_F$-iodide 20.06 g (26.7 mmol lysine) of the product from Example 29B is placed into a round-bottomed flask to which is added 2.3 g (24.6 mmol) of 2-chloroacetamide over a five minute period. The reaction mixture is heated to 65° C. and stirred for three hours. At the end of three hours, 3.76 g (7.38 mmol) of ZONYL TELA-L is added to the reaction mixture along with 0.25 g (1.2 mmol) of sodium hydrosulfite, 2.5 g of hexylene glycol and 7.0 g deionized water. The reaction mixture is stirred under nitrogen at 15–20° C. for three hours. Conversion of $R_F$-iodide, as determined by gas chromatography, is >93%. The product is a clear amber mixture of 40.8% solids by weight and 5.8% F.

EXAMPLE 29–33

Following the procedure of Example 29C, compounds are synthesized using the hydrophilic reactants listed in the table:

| Example No. | Hydrophile | g/mmol | $R_F$-iodide | Solids/% F |
|---|---|---|---|---|
| 29 | QUAB | 1.75/11.5 | ZONYL TELA-L | 22.9/3.3 |
| 30 | Glycidol | 0.63/8.19 | ZONYL TELA-L | 32.3/4.9 |
| 31 | QUAB | 0.54/2.53 | ZONYL TELA-L | 23.4/3.5 |
| 32 | QUAB | 0.54/2.53 | Perfluorohexyl iodide | 29.4/3.8 |
| 33 | Acetic anh. | 0.85/8.37 | ZONYL TELA-L | 30.9/4.7 |

QUAB = glycidyl-trimethylammonium chloride (QUAB 151)

EXAMPLE 34
Reaction of Lysine, Epichlorohydrin, Allyl Glycidyl Ether, Chloroacetic Acid and $R_F$-iodide 10.0 g (54.7 mmol) of lysine monohydrochloride and 24.6 g of a 19.5% NaOH solution are placed into a round-bottomed flask equipped with a stirrer, nitrogen inlet and a thermo-regulator. This mixture is heated and stirred. When a temperature of 65° C. is reached, 5.0 g (54.7 mmol) of epichlorohydrin are added over a thirty minute period. The reaction mixture is then stirred for three hours at 65° C., after which time the reaction is complete as determined by gas chromatography. Then 3.74 g (32.8 mmol) allyl glycidyl ether and 8.3 g (71.1 mmol) of sodium chloroacetate are added together with 1.0 g (12.5 mmol) of 50% NaOH. Then 8.33 g (16.4 mmol) of perfluoroalkyl iodide (ZONYL TELA-L) and 1.0 g (4.9 mmol) of sodium hydrosulfite are added along with 5.5 g hexylene glycol and 15.0 g of deionized water. conversation of $R_F$-iodide, as determined by gas chromatography, is >98%. The product is a clear amber mixture having 43.7% solids by weight and 5.2% F.

The compositions of Examples 19–34 are summarized in Table 4 below:

TABLE 4

| Ex. No. | Ratio of Ly/EPI[3] | | Reactant equivalents | | | | Ratio of Ly/EPI/$R_F$ and Hydrophile in product | % F in actives |
|---|---|---|---|---|---|---|---|---|
| | Ly | EPI | AGE | $R_f$I | Hydrophile = HY | | | |
| 19 | 1 | 0.3 | 0.3 | 0.27[1] | CAC 2.9 | | 1/0.3/0.3/0.27/2.9 | 6.7 |
| 20 | 1 | 0.5 | 0.3 | 0.27[1] | CAC 2.7 | | 1/0.5/0.3/0.27/2.7 | 6.8 |
| 21 | 1 | 0.7 | 0.3 | 0.27[1] | CAC 2.5 | | 1/0.7/0.3/0.27/2.5 | 6.4 |
| 22 | 1 | 0.7 | 0.6 | 0.54[1] | CAC 2.5 | | 1/0.7/0.6/0.54/2.5 | 8.4 |
| 25 | 1 | 0.8 | 0.3 | 0.27[1] | CA 0.9 | | 1/0.8/0.3/0.27/0.9 | 5.8 |
| 23 | 1 | 0.8 | 0.3 | 0.27[1] | TMP 0.9 | | 1/0.8/0.3/0.27/0.9 | 5.8 |
| 24 | 1 | 0.8 | 0.3 | 0.27[1] | TMP 0.45 + CA 0.45 | | 1/0.8/0.3/0.27/0.45/0.45 | 5.6 |
| 26 | 1 | 0.85 | 0.6 | 0.3[1] | CAC 1.6 | | 1/0.85/0.6/0.3/1.6 | 5.8 |
| 27 | 0.85 | 0.9 | 0.3 | 0.25[1] | ADS 0.3 | | 0.85/0.9/0.3/0.3/0.25 | 7.0 |
| 28 | 1 | 0.9 | 0.3 | 0.27[1] | CA 0.9 | | 1/0.9/0.3/0.27/0.9 | 5.8 |
| 29 | 1 | 0.9 | 0.3 | 0.27[1] | QUAB 0.3 | | 1/0.9/0.3/0.3/0.27 | 3.3 |
| 30 | 1 | 0.9 | 0.3 | 0.27[1] | GLY 0.3 | | 1/0.9/0.3/0.3/0.27 | 4.9 |
| 31 | 1 | 0.9 | 0.3 | 0.27[1] | QUAB 0.1 | | 1/0.9/0.3/0.1/0.27 | 3.49 |
| 32 | 1 | 0.9 | 0.3 | 0.27[1] | QUAB 0.1 | | 1/0.9/0.3/0.1/0.27 | 3.8 |
| 33 | 1 | 0.9 | 0.3 | 0.27[1] | AA 0.3 | | 1/0.9/0.3/0.3/0.27 | 4.7 |
| 34 | 1 | 1 | 0.6 | 0.3[1] | CAC 1.3 | | 1/1/0.6/0.3/1.3 | 5.2 |

*XL = chain-extending material
[1]ZONYL TELA-L
[2]perfluorohexyliodide
[3]Ly = Lysine; EPI = epichlorohydrin
CAC = sodium chloroacetate
CA = 2-chloroacetamide
TMP = sodium trimetaphosphate
QUAB = glycidyltrimethylammonium chloride (Quab 151)
ADS = 1-amino-1-deoxy-D-sorbitol
GLY = glycidol
AA = acetic anhydride.

EXAMPLE 35
Performance of foam stabilizers of Examples 19–33 with sea water (0.8% F in formulation).

The efficacy of foam stabilizers was determined by preparing an AR-AFFF concentrate by blending the AR-AFFF base formulation at the 0.6% F level with the foam stabilizers of Examples 19–33 at the 0.2% F level. Foam Expansion Ratio, Quarter Drain Time and Foam Life on hot 2-propanol and acetone were determined using 3% premix in salt water. A commercial foam stabilizer, DYNAX 5011 (Dynax Corp., Elmsford, N.Y.), and an AR-AFFF base sample without foam stabilizer added were used as controls.

TABLE 5

| Foam Stabilizer Ex. No. | Foam Expansion Ratio | Quarter Drain Time (min) | Foam Life on Hot 2-Propanol (min) | Foam Life on Hot Acetone (min) |
| --- | --- | --- | --- | --- |
| 19 | 6.5 | 6:45 | 2:00 | 8:00 |
| 20 | 7.0 | 7:00 | 3:20 | 12:00 |
| 21 | 7.0 | 6:20 | 2:00 | 5:00 |
| 22 | 7.0 | 7:39 | 12:14 | 15:26 |
| 23 | 7.1 | 6:30 | 6:30 | 17:00 |
| 24 | ND | ND | ND | ND |
| 25 | 7.1 | 6:25 | 6:00 | 10:00 |
| 26 | 7.3 | 8:09 | 3:13 | 10:46 |
| 27 | 7.0 | 7:12 | 16:00 | 13:00 |
| 28 | 7.9 | 7:30 | 17:55 | 34:50 |
| 29 | 7.3 | 7:20 | 17:10 | 16:12 |
| 30 | 7.5 | 7:05 | 12:25 | 32.51 |
| 31 | 7.2 | 7:09 | 31:43 | >45 |
| 32 | 7.3 | 7:47 | 20:57 | 26:23 |
| 33 | 7.1 | 6:90 | 25:25 | 25:00 |
| DYNAX 5011 | 8.4 | 7:41 | 16:00 | 14:03 |
| NONE | 7.4 | 7:00 | 0:15 | 1:15 |

EXAMPLE 36

Permance of Foam Stabilizers of Examples 19–34 with Tap Water (0.8%F in Formulation)

The efficacy of foam stabilizers was determined by preparing an AR-AFFF concentrate by blending the standard AR-AFFF base formulation at the 0.6% F level with the foam stabilizers of Examples 17–28 at the 0.2% F level. Foam Expansion Ratio, Quarter Drain Time and Foam Life on hot 2-propanol and acetone were determined using a 3% premix in tap water. A commercial foam stabilizer, DYNAX 5011, and a AR-AFFF base sample without foam stabilizer added were used as controls.

The Foam Life test results for examples 19–38 in 3% tap water are shown in Table 6 below;

TABLE 6

| Foam Stabilizer Ex. No. | Foam Expansion Ratio | Quarter Drain Time (min) | Foam Life on Hot 2-Propanol (min) | Foam Life on Hot Acetone (min) |
| --- | --- | --- | --- | --- |
| 19 | 7.3 | 8:35 | 0:20 | 15:00 |
| 20 | 7.3 | 8:30 | 0:45 | 22:00 |
| 21 | 6.5 | 9:00 | 0:54 | 18:00 |
| 22 | 8.0 | 9:29 | <1 | 20:15 |
| 23 | 8.3 | 8:20 | 4:00 | 15:00 |
| 24 | 7.0 | 8:00 | 0:20 | ND |
| 25 | 8.0 | 9:00 | 1:00 | 13:00 |
| 26 | 7.2 | 8:19 | <1 | 21:03 |
| 27 | 8.0 | 9:00 | <1 | 14:00 |
| 28 | 7.5 | 6:43 | 4:22 | >30 |
| 29 | 8.0 | 7:30 | <1 | >30 |
| 30 | 7.0 | 8:47 | 1:51 | 8:42 |
| 31 | 7.3 | 8:26 | 3:00 | >45 |
| 32 | 7.4 | 7:58 | 1:00 | >45 |
| 33 | 6.7 | 7:15 | 0:20 | ND |

TABLE 6-continued

| Foam Stabilizer Ex. No. | Foam Expansion Ratio | Quarter Drain Time (min) | Foam Life on Hot 2-Propanol (min) | Foam Life on Hot Acetone (min) |
| --- | --- | --- | --- | --- |
| 34 | 7.4 | 8:27 | 1:50 | >45 |
| DYNAX 5011 | 8.3 | 8:19 | 12:11 | 20:04 |
| NONE | 7.4 | 9:00 | 0:10 | 4:30 |

EXAMPLE 37

The Following Example Describes the Synthesis of a Paper Size 60.2 g (84.0 mmol) of the lysine-epichlorohydrin reaction product from Example 11A are placed into a round-bottomed flask equipped with a stirrer, nitrogen inlet and a thermoregulator. To this round-bottomed flask is added 3.18 g (27.9 mmol) allyl glycidyl ether.

The reaction mixture is heated to 65° C. and stirred for three hours. Some of this polymer is isolated for the next step.

23.18 g (27.9 mmol) of this allyl intermediate are placed into a round-bottomed flask equipped with a stirrer, nitrogen inlet and a thermoregulator. The reaction mixture is cooled to 10° C. and 15.0 g (25.1 mmol) of ZONYL TELA-N are added to the reaction mixture along with 0.53 g (2.79 mmol) sodium hydrosulfite, 0.21 g (1.11 mmol) 2,2'azo-bis isobutyronitrile (AIBN) and 10 g 1-propanol. The reaction mixture is stirred under nitrogen at 80° C. for five hours. Conversion of $R_F$-iodide, as determined by gas chromatography, is >95%. The reaction mixture is cooled to 70° C. and 2.7 g (33.5 mmol) 50% sodium hydroxide are added to obtain a completely dehalogenated product. The 1-propanol is distilled off and 50 g water are added. The product is a clear gelatinous brown mixture containing 27.6% solids by weight and 5.4% F.

EXAMPLE 38

The process of example 37 is repeated using 1.59 g (13.9 mmol) allyl glycidyl ether and 7.7 g (12.55 mmol) ZONYL TELA-N, along with 0.53 g sodium metabisulfite, 0.21 g AIBN, 5 g 1-propanol and 60 g water. The product contains 19.8% solids and 3.3% F.

EXAMPLE 39

Samples of poly-perfluoroalkyl-substituted poly-(amino-acids) of examples 37 and 38 were evaluated as external paper sizes using the previously described size press application. Oil Kit Numbers are reported at applied fluorine levels.

| Example | Compound of Example No. | % F | Oil Kit # |
| --- | --- | --- | --- |
| 39a | 37 | 0.07 | 5 |
|  |  | 0.10 | 7 |
| 39b | 38 | 0.07 | 5 |
|  |  | 0.10 | 6 |

EXAMPLE 40

The Following Example Describes the Synthesis of a Foam Stabilizer Using Allyl Chloride 25.0 g (35.6 mmol) of the lysine-epichlorohydrin reaction product from Example 11A are placed into a round-bottomed flask equipped with a stirrer, nitrogen inlet and a thermoregulator. To this round-bottomed flask is added 0.86 g (10.7 mmol) of allyl chloride and 0.5 g (6.25 mmol) 50% NaOH. The reaction mixture is heated to 40° C. and stirred for three hours. Some of this polymer is isolated for the next step.

24.6 g (33.7 mmol) of this allyl intermediate are placed into a round-bottomed flask equipped with a stirrer, nitrogen inlet and a thermoregulator. The reaction mixture is cooled to 10° C. and 4.29 g (9.6 mmol) perfluorohexyl iodide are added to the reaction mixture along with 0.28 g (1.35 mmol) of sodium hydrosulfite, 0.21 g (1.11 mmol) AIBN and 2.0 g hexylene glycol. The reaction mixture is stirred under nitrogen at 25° C. for three hours. Conversion of $R_F$-iodide, as determined by gas chromatography, is >97%. The product is a cloudy yellow mixture containing 44.6% solids by weight and 7.2% F.

I claim:

1. A perfluoroalkyl- or alkenyl-substituted polyamino acid which comprises an oligomer or copolymer of an aliphatic diamino carboxylic acid having 3 to 10 carbon atoms, which perfluoroalkyl-or alkenyl-substituted polyamino acid contains at least two perfluoroalkyl or alkenyl groups attached to nitrogen atoms through a linking group.

2. A perfluoroalkyl- or alkenyl-substituted polyamino acid according to claim 1, which comprises an oligomer or polymer of an aliphatic diamino carboxylic acid having 3 to 10 carbon atoms and containing at least two structural units, J, having perfluoroalkyl or alkenyl groups, $R_F$, attached to nitrogen atoms of the oligomer or copolymer through a linking group L,
wherein J is a mixture of

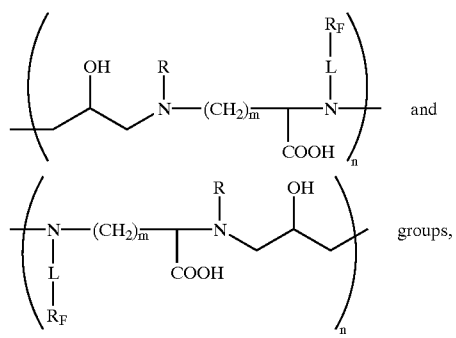

and groups,

L is —Q—CH$_2$—CH=CH— and/or —Q—CH$_2$CHI—CH$_2$—, in which

Q is CH$_2$—CHOH—CH$_2$—O, (C=S)—NH or a direct bond, $R_F$ is a monovalent perfluorinated alkyl or alkenyl group, R is hydrogen or an ionic or nonionic water-solubilizing group, m is an integer from 1 to 8 and n is an integer from 2 to 100.

3. A perfluoroalkyl- or alkenyl-substituted polyamino acid according to claim 2, wherein Q is
—CH$_2$—CHOH—CH$_2$—O—.

4. A perfluoroalkyl- or alkenyl-substituted polyamino acid according to claim 2, wherein each $R_F$ is independently a monovalent perfluorinated alkyl or alkenyl, linear or branched organic radical having four to twenty fully fluorinated carbon atoms.

5. A perfluoroalkyl- or alkenyl-substituted polyamino acid according to claim 4, wherein each $R_F$ is saturated and contains 6–12 carbon atoms, is fully fluorinated and contains at least one terminal perfluoromethyl group.

6. A perfluoroalkyl- or alkenyl-substituted polyamino acid according to claim 5, wherein each $R_F$ is a —C$_6$F$_{13}$ group.

7. A perfluoroalkyl- or alkenyl-substituted polyamino acid according to claim 2, wherein R is hydrogen.

8. A perfluoroalkyl- or alkenyl-substituted polyamino acid according to claim 2, wherein R is an ionic water-solubilizing group selected from the group consisting of carboxy-, phosphate-, sulfate-, sulfonate- and quaternary ammonium-containing groups.

9. A perfluoroalkyl- or alkenyl-substituted polyamino acid according to claim 2, wherein R is a nonionic water-solubilizing group selected from the group consisting of amide-, tertiary amino-and poly-(oxyethylene)-containing groups.

10. A perfluoroalkyl- or alkenyl-substituted polyamino acid according to claim 1 which has a weight average molecular weight of from about 500 to 100,000.

11. A perfluoroalkyl- or alkenyl-substituted polyamino acid which is a reaction product of
(A) an aliphatic diamino acid having 3 to 10 carbon atoms,
(B) an amino-reactive chain extender,
(C) allyl glycidyl ether, allyl chloride or bromide, or allyl isothiocyanate and
(D) a perfluoroalkyl iodide, and, optionally,
(E) an amino acid other than (A), a monoglycidyl compound other than allyl glycidyl ether or an aliphatic or aromatic amine or diamine, and also, optionally,
(F) an amino-reactive organic compound selected from halogenated carboxylic- or sulfonic acids or their salts, vinyl unsaturated acids, anhydrides, glycidol and chloroacetamide.

12. A perfluoroalkyl- or alkenyl-substituted polyamino acid according to claim 11 in which (A) is an aliphatic diamino acid of the formula

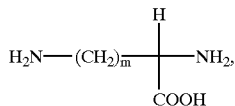

where m is an integer from 1 to 8.

13. A perfluoroalkyl- or alkenyl-substituted polyamino acid according to claim 12 in which (A) is lysine.

14. A perfluoroalkyl- or alkenyl-substituted polyamino acid according to claim 11 in which (A), (B), (C), (D), (E) and (F) are reacted in molar ratios of (A) 1/(B)0.2–0.99/(C) 0.15–0.6/(D)0.15–0.5/(E)0–0.2/(F)0–0.2.

15. A process for the preparation of a perfluoroalkyl- or alkenyl-substituted polyamino acid according to claim 2, which comprises
a) reacting an aliphatic diamino acid having 3 to 10 carbon atoms with an amino-reactive chain extender in the presence of an acid acceptor to form an intermediate polyamino acid;
b) reacting the intermediate polyamino acid formed in step a) with an amino-reactive allyl compound; then
c) reacting the polyallyl-substituted polyamino acid formed in step b) with a perfluoroalkyl iodide in the presence of a free radical initiator.

16. An essentially aqueous solution comprising 15 to 50% of an oligomer or copolymer of an aliphatic diamino acid having 3 to 10 carbon atoms and containing at least two perfluoroalkyl or alkenyl groups attached to nitrogen atoms through a linking group according to claim 1.

17. A method to improve the oil repellency of paper, which comprises applying to paper or paper board as an external coating or in a size press, an effective amount of a perfluoroalkyl- or alkenyl-substituted polyamino acid according to claim 1.

18. A method to improve the oil repellency of paper, which comprises applying to paper or paper board as an external coating or in a size press, an effective amount of a perfluoroalkyl- or alkenyl-substituted polyamino acid according to claim 2.

19. A method to improve the performance of an alcohol-resistant, aqueous fire-fighting foam formulation, which comprises replacing, entirely or in part, a conventional foam stabilizer therein by at least one perfluoroalkyl- or alkenyl-substituted polyamino acid according to claim 1.

20. A method to improve the performance of an alcohol-resistant, aqueous fire-fighting foam formulation, which comprises replacing, entirely or in part, a conventional foam stabilizer therein by at least one perfluoroalkyl- or alkenyl-substituted polyamino acid according to claim 2.

21. A method to convert a conventional aqueous fire-fighting foam fire-fighting formulation into an alcohol-resistant, aqueous fire-fighting foam agent which comprises incorporating an effective amount of a perfluoroalkyl- or alkenyl-substituted polyamino acid according to claim 1 therein.

22. A method to convert a conventional aqueous fire-fighting foam fire-fighting formulation into an alcohol-resistant, aqueous fire-fighting foam agent which comprises incorporating an effective amount of a perfluoroalkyl- or alkenyl-substituted polyamino acid according to claim 2 therein.

* * * * *